United States Patent
Carsello

(10) Patent No.: US 9,763,209 B2
(45) Date of Patent: Sep. 12, 2017

(54) INTERFERENCE-TOLERANT MULTI-BAND SYNCHRONIZER

(71) Applicant: xG Technology, Inc., Sarasota, FL (US)

(72) Inventor: Stephen R. Carsello, Plantation, FL (US)

(73) Assignee: xG Technology, Inc., Sarasota, FL (US)

( * ) Notice: Subject to any disclaimer, the term of this patent is extended or adjusted under 35 U.S.C. 154(b) by 75 days.

(21) Appl. No.: 14/837,252

(22) Filed: Aug. 27, 2015

(65) Prior Publication Data

US 2017/0064654 A1    Mar. 2, 2017

Related U.S. Application Data

(60) Provisional application No. 62/055,770, filed on Sep. 26, 2014.

(51) Int. Cl.
*H04W 56/00* (2009.01)
*H04L 5/00* (2006.01)
*H04B 7/04* (2017.01)
*H04L 27/26* (2006.01)

(52) U.S. Cl.
CPC ............ *H04W 56/003* (2013.01); *H04B 7/04* (2013.01); *H04L 5/001* (2013.01); *H04L 27/2663* (2013.01); *H04L 27/2672* (2013.01); *H04L 27/2688* (2013.01); *H04L 27/2691* (2013.01); *H04L 5/0023* (2013.01)

(58) Field of Classification Search
None
See application file for complete search history.

(56) References Cited

U.S. PATENT DOCUMENTS

| 6,161,024 | A | * | 12/2000 | Komara | H04W 88/08 |
| | | | | | 455/101 |
| 2009/0046671 | A1 | * | 2/2009 | Luo | H04J 11/0069 |
| | | | | | 370/336 |
| 2011/0310948 | A1 | * | 12/2011 | Ramesh | H04B 7/0857 |
| | | | | | 375/229 |
| 2014/0119316 | A1 | * | 5/2014 | Linden | H04L 5/0048 |
| | | | | | 370/329 |
| 2014/0200901 | A1 | * | 7/2014 | Kawashima | G10L 21/0388 |
| | | | | | 704/500 |
| 2015/0153380 | A1 | * | 6/2015 | Elhoushi | G01P 15/14 |
| | | | | | 702/141 |

* cited by examiner

*Primary Examiner* — Brandon Renner
*Assistant Examiner* — Jay Vogel
(74) *Attorney, Agent, or Firm* — Dennis L. Cook, Esq.

(57) ABSTRACT

A multi-band synchronizer that performs robustly in the presence of partial-band interference by breaking down the correlation of a sync waveform at a plurality of times, with one or more received signal branches into a multitude of sub-band correlations, and combining the sub-band correlations such that the impact of partial-band interference on synchronization performance is significantly mitigated is disclosed.

4 Claims, 2 Drawing Sheets

INTERFERENCE-TOLERANT MULTI-BAND SYNCHRONIZER

CROSS-REFERENCE TO RELATED APPLICATION

The present application claims the benefit of previously filed Provisional Patent Application, Ser. No. 62/055,770 filed on Sep. 26, 2014.

FIELD OF THE INVENTION

This invention describes a synchronization method for over air interfaces. More specifically this invention describes a partial-band interference tolerant multi-band synchronizer for a typical OFDM system employing antenna diversity.

BACKGROUND OF THE INVENTION

In modern communication systems, coherent detection is usually employed, which requires a receiver to be very accurately synchronized with the transmitter in both time and frequency. In most systems, key elements of the synchronization scheme are designed with only additive white Gaussian noise (AWGN) in mind. However, many emerging devices operate in unlicensed spectrum, e.g., the 902-928 Industrial Scientific and Medical (ISM) band, where many unpredictable forms of interference are consistently present. In such devices, these commonly-used synchronization schemes, designed for best operation under AWGN conditions only, may vastly under-perform in strong interference environments. Furthermore, modern air interfaces, e.g., those employing Orthogonal Frequency Division Multiplexing (OFDM), often lend themselves to powerful detection techniques that potentially provide extreme resilience against the most powerful of interferers. This potential immunity to interference, however, will never be harnessed unless the receiver is able to acquire and maintain synchronization in the presence of such interference. The invention described herein pertains to receivers, in general, and is described within the context of, but not limited to, an OFDM system employing antenna diversity. Furthermore, the invention is primarily directed to partial-band interference, which is the most-common form of interference encountered when operating in unlicensed spectrum such as the 902-928 MHz ISM band.

In order to demonstrate the problem solved by this invention, along with the capability of the invention itself, we first provide a basic description of the system model and its key components, as illustrated in the block diagram of FIG. 1. Note that the ideas disclosed within this document are not strictly limited to the system under consideration as those skilled in the art can easily realize after review of this disclosure.

In FIG. 1 data packets are generated and encoded into channel bits. An OFDM symbol mapper converts the encoded channel bits into N streams of complex channel symbols, where N is the number of transmit antennas, and maps them onto the OFDM time-frequency grid, while merging them with known channel symbols used for synchronization and channel estimation/training. An OFDM modulator converts the N streams of complex time-frequency symbols into N complex time-domain waveforms, using an inverse fast Fourier transform (IFFT) with cyclic prefix insertion. A channel function generates time-dispersive channel fading, which exhibits a frequency-selective gain, for the OFDM and interfering signals, producing an output consisting of M waveforms, where M is the number of receive antennas. The interfering signal is modeled as either a continuous wave (CW), or a complex Gaussian signal of specified bandwidth, center frequency, starting point, and duration. Note that each of the bandwidth, center frequency, starting point, and duration may be specified as random. A receiver filter removes out-of-band noise from the noisy received signal, before splitting the filtered signal off into two branches. In the diagram, the upper branch is the synchronization block, which is the primary focus of this disclosure. The synchronizer generates time and frequency offset information, which is essential for proper operation of the OFDM demodulator and ensuing blocks. The OFDM demodulator performs a fast Fourier transform (FFT) on blocks of samples that have been time and frequency corrected by the synchronizer. The FFT output is fed to a channel estimation block, which estimates the channel gains for the desired signal, as well as any other important characteristics of the received signal, which are then fed, along with the FFT output, to the detector block. Note that the channel estimator may be particularly sensitive to synchronization error, depending on its design. The detector block uses the M branches of the FFT output, and channel estimation information, to form a best estimate of the complex transmitted symbols. These complex symbol estimates are sent to a de-mapping function, which may make further measurements pertaining to the received signal, along with its primary function of converting the complex symbol estimates to bit-level estimates for the purpose of channel decoding.

A traditional synchronizer correlates against a known sync waveform embedded within the waveform, and adjusts symbol timing and sometimes frequency offset based on the results of this correlation. Another very commonly used form of coarse sync acquisition for OFDM, e.g. that proposed by Schmidl, embeds a repeated pattern into the OFDM waveform at the transmitter, and in the receiver, correlates the received signal against a delayed version of itself, in an attempt to detect this repetition. This method is very effective under AWGN conditions, since it allows a very wide frequency offset capture range, offers good initial frequency offset estimation, and is computationally very simple. In such traditional schemes, the fine timing sync is then achieved by correlating the received signal against the known sync waveform, after initial acquisition and frequency offset correction. While this method is effective under AWGN conditions, these typical methods perform very poorly under interference conditions, and in this case, are, by far, the limiting factor in determining the receiver's ability to reject partial-band interference.

In the case of frequency offset estimation, these common methods, which correlate the received signal against a delayed version of itself when estimating offset, are very easily thrown off frequency by any noise or interference which are colored. In addition, this correlation method is easily fooled into false detection when in the presence of colored noise or interference, potentially leaving the receiver in a perpetual state of confusion if colored noise is continuously present. Furthermore, the fine sync correlation against the known sync waveform is rendered ineffective and therefore useless whenever strong partial-band interference is present, since the desired signal is very easily over-powered.

BRIEF SUMMARY OF THE INVENTION

This invention describes a multi-band synchronizer, which performs robustly in the presence of partial-band interference, by breaking down the correlation of a sync waveform, at a plurality of times, with one or more received signal branches, into a multitude of sub-band correlations, and combining the sub-band correlations such that the impact of partial-band interference on synchronization performance is significantly mitigated.

For a fuller understanding of the nature and objects of the invention, reference should be made to the following detailed description taken in connection with the accompanying drawings.

DESCRIPTION OF THE DRAWINGS

For a fuller understanding of the nature and objects of the invention, reference should be made to the accompanying drawings, in which.

DETAILED DESCRIPTION OF THE INVENTION

The disclosed synchronization method will now be described in mathematical detail. The typical sync word correlation is here modified, and presented in the form of a multi-band synchronizer, which uses intelligent signal processing to combine sub-band correlations into a single correlation waveform which performs robustly in the presence of partial-band interference.

Figure 1:
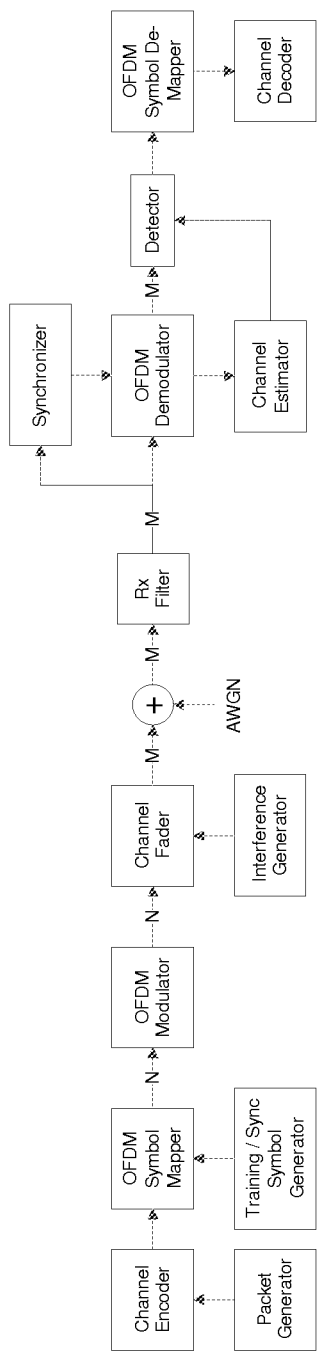
FIG. 1 is a diagram showing an over air interface system model and it's key components; and, FIG. 2 is a diagram showing frequency response of 4 sub-bands.
Figure 2:
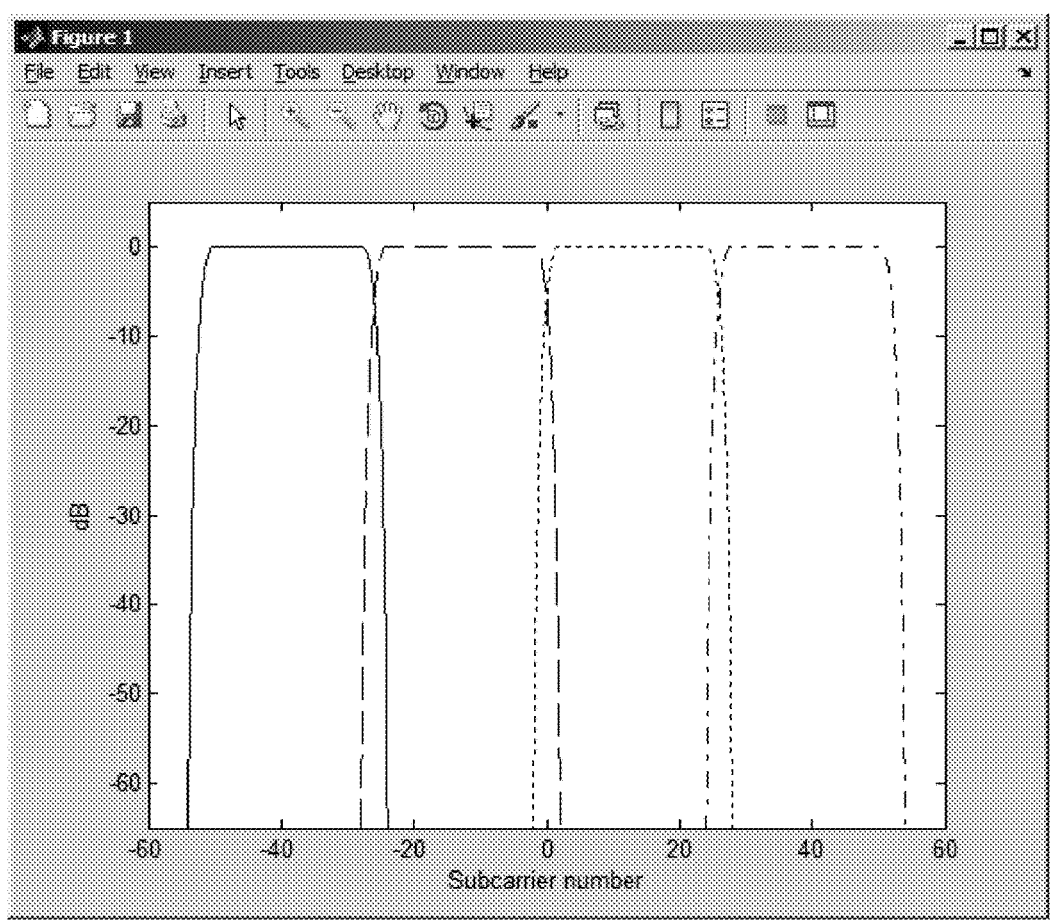

In the preferred embodiment of the invention we let $r_{m,n}$ be the complex received time sample n of receive branch m. We define a set $$\{h_n^{(i)}\}|_{i=1}^{N_b}$$

of $N_b$ complex filter impulse responses, each of length $N_h$, where each complex impulse response $\{h_n^{(i)}\}$ has a passband frequency response which covers a portion, or sub-band, of the OFDM signal band. FIG. 2 shows the frequency responses for the case of $N_b=4$ sub-bands, with the property that the sum of these responses produces a flat passband that covers the entire OFDM signal band.

Next we let $$x_{m,n}^{(i)} = \sum_{k=0}^{N_h-1} h_k^{(i)} r_{m,n-k}$$

be the output of sub-band filter i for receive branch m at sample time n. With complex input samples $\{r_{m,k}\}$ and a complex sub-band filter impulse response $\{h_n^{(i)}\}$, this filtering function is potentially expensive if implemented as stated, using brute-force convolution. It should be appreciated by one well-versed in the art of signal processing that this operation can be performed equivalently and more efficiently in the frequency domain, using, for instance, the FFT overlap-and-add method. From these sub-band filter outputs, we compute the following two signal sequences $$y_{m,n}^{(i)} = \sum_{k=0}^{N_w-1} w_k^* x_{m,n+k}^{(i)}$$

-continued $$e_n^{(i)} = \sum_{m=1}^{M} \sum_{k=0}^{N_w-1} |x_{m,n+k}^{(i)}|^2$$

where $\{w_n\}|_{n=1}^{N_w}$ is the known, complex OFDM sync waveform of length $N_w$ in samples, with the general property $$\sum_{n=0}^{N_w-1} |w_n|^2 = 1$$

The sub-band sync correlation sequence $\{y_{m,n}^{(i)}\}$ is the sliding correlation between the known, complex conjugate sync sequence and sub-band i of the received signal on branch m, and the sequence $\{e_n^{(i)}\}$ is sum total of received signal energy for sub-band i, over the same moving time interval as that used for the sub-band sync correlation.

We then form $N_c$ combinations of the sub-band sync correlations, where $l\epsilon[1,N_c]$ denotes the combination index. The sub-band indices used to form combination l are denoted $\{i_{l,p}\}|_{p=1}^{P_l}$, where $P_l$ is the number of sub-bands used in combination l. The complex sync correlation for combination l at sample time n on receive branch m is $$z_{l,n,m} = \sum_{p=1}^{P_l} y_{m,n}^{(i_{l,p})}$$

with scaled, net correlation energy $$C_{l,n} = \left(\frac{N_b}{P_l}\right) \sum_{m=1}^{M} |z_{l,n,m}|^2$$

and corresponding signal energy $$E_{l,n} = \sum_{p=1}^{P_l} e_n^{(i_{l,p})}$$

A sync correlation "hit" is said to have occurred, for combination l and sample time n, whenever $$C_{l,n} > \eta_{h,l} E_{l,n}$$

where $\eta_{h,l}$ is a pre-determined, fixed detection threshold for combination l, which is always less than unity. Upon sync detection, frame and symbol timing estimation may be performed using techniques known by those well-versed in the art, thus providing symbol timing estimate $\hat{n}_{0,l}$ for combination l. Furthermore, within the embodiment of this disclosure, in addition to symbol timing information, we wish to obtain frequency offset information from the sync word as well. To this end, the sync word is specified to be transmitted twice within an appropriate time span, thereby providing the opportunity to measure phase changes in the sync correlations between the two transmissions, which translate to frequency offset. It must be noted that, for each sync word transmission, multiple sync correlation hits may be observed, due to multipath fading. Let $\{n_{h,l}\}$ be the set of sample time indices at which sync hits occur for combination l on each of the two sets $\{n_{h,l}\}$ and $\{n_{h,l}+N_\Delta\}$, where $N_\Delta$ is the time difference, in samples, between the two sync words. In other words, $\{n_{h,l}\}$ are the sample phases at which multipath sync hits occur for combination l on each of the two transmissions. Within the embodiment of this invention, the frequency offset, in Hz, for combination l is $$\hat{f}_{0,l} = \left(\frac{f_s}{2\pi N_\Delta}\right) \phi \left( \sum_{n \in \{n_{h,l}\}} \sum_{m=1}^{M} z_{l,n+N_\Delta,m} z_{l,n,m}^* \right)$$

where $f_s$ is the sampling frequency, in Hz, and $\Phi(\cdot)$ represents the four-quadrant angle, in radians, of a complex number. These are quality estimates, since we only use correlations where sync hits occur on each of the two sync transmissions, and also, since the phasors of each receive branch m are weighted according to the sync correlation levels.

We have now established a multi-band sync correlator and combiner which provides, for each combination l of $N_c$ combinations, an event of sync detection, a symbol timing estimate $\hat{n}_{0,l}$, and a frequency offset estimate $\hat{f}_{0,l}$. We will now describe the method for selecting which combination to use when updating the system symbol timing and frequency synchronization. It should be pointed out that we do not actually need to compute the offset estimates for each combination l, and that it is only necessary to compute the offsets for the chosen combination $l_0$, after the selection process, which will now be described.

In order to qualify each combination l, let $n_{0,l}$ be the sample index, among the samples within the search window of the two sync words, where a sync hit occurs, and where the sequence $\{C_{l,n}\}$ is maximum. In addition, let $I_l$ be the integer peak resolution for combination l, which is usually a multiple of an integer over-sampling factor relative to the signal bandwidth. Next, define the peak sample set $\{n_{p,l}\}$ as those samples, within the search window of the two sync words, where a sync hit for combination l occurs, and which are offset from $n_{0,l}$ by integer multiples of the peak resolution $I_l$.

We then define the following qualifiers for combination:

$$\Gamma_{C,l} = \left(\frac{1}{E_{l,n_{0,l}}}\right) \sum_{n \in \{n_p\}} C_{l,n}$$

$$\Gamma_{E,l} = \left(\frac{N_b}{P_l}\right) E_{l,n_{0,l}}$$

where $\Gamma_{C,l}$ can be thought of as the normalized energy accumulated in all of the sync correlation peaks, which will be close to unity in good signal conditions, and $\Gamma_{E,l}$ is the corresponding received signal energy, time-aligned with $\Gamma_{C,l}$, and scaled inversely by the number of sub-bands used for combination l. In addition, we order the combinations such that, as l increases, the number of sub-bands $P_l$ used to form combination l is non-increasing. With this arrangement, when there is no partial-band interference present, we would not expect the quality of the sync correlation to improve with increasing l.

We then perform the following algorithm:
1. Initialize $\Gamma_{C,0} = \Gamma_{E,0} = 0$
2. Set l=1
3. If combination l has a sync hit and a valid frequency offset estimate:

a. If $(\Gamma_{C,l} > \eta_{1,l} \Gamma_{C,0})$ or $((\Gamma_{C,l} > \eta_{2,l} \Gamma_{C,0})$ and $(\Gamma_{E,0} > \eta_{3,l} \Gamma_{E,l}))$
     i. Set $\Gamma_{C,0} = \Gamma_{C,l}$
     ii. set $\Gamma_{E,0} = \Gamma_{E,l}$
     iii. Set $l_0 = l$
4. Increment l=l+1
5. If ($l \leq N_c$) then go back to Step 3.

The explanation of the algorithms is as follows. The first condition in Step 3a demands that the net normalized sync correlation energy $\Gamma_{C,l}$ exceed the maximum previously stored quantity $\Gamma_{C,0}$ by a healthy margin. To this end, the first threshold $\eta_{1,l}$ is typically greater than unity. A second alternate condition leading us to replace the best stored combination with the current combination has two conditions of its own, the first of which demands that the net normalized sync correlation energy $\Gamma_{C,l}$ exceed the maximum previously stored quantity $\Gamma_{c,0}$ using a second threshold $\eta_{2,l}$, which is more relaxed and therefore lower than the first threshold $\eta_{1,l}$. However, in addition, we require that the previously-stored quantity $\Gamma_{E,0}$ exceed the signal energy metric $\Gamma_{E,l}$ using a third threshold $\eta_{3,l}$ which is meant to be greater than unity.

The reason for this second alternate condition is, while the net normalized sync correlation energy $\Gamma_{C,l}$ may not be sufficiently stronger than the maximum previously stored quantity $\Gamma_{C,0}$ using threshold $\eta_{1,l}$, if it is adequately stronger, based on the relaxed threshold $\eta_{2,l}$, even though its energy $\Gamma_{E,l}$ appears to be significantly lower than the best previously-stored energy $\Gamma_{E,0}$, then the current combination l is likely less interfered with than the previously-stored best combination. This is a sound method that has been shown to significantly improve an interference-aware receiver's ability to maintain synchronization and reject strong partial-band interference.

Since certain changes may be made in the above described method for a interference-tolerant multi-band synchronizer for over air interfaces without departing from the scope of the invention herein involved, it is intended that all matter contained in the description thereof or shown in the accompanying figures shall be interpreted as illustrative and not in a limiting sense.

What is claimed is:

1. A multi-band synchronization method for over air interfaces that performs robustly in the presence of partial-band interference comprising:
   breaking down the correlation of a sync waveform at a plurality of times with one or more received signal branches into a multitude of sub-band correlations:
   then combining the sub-band correlations such that the impact of partial-band interference on synchronization performance is significantly mitigated:
   for each said received signal branch the received signal is filtered using overlap- and-add Fast Fourier Transform processing into multiple time-domain waveforms with each waveform representing one of a plurality of sub-bands of said received signal,
   each sub-band waveform and each received signal branch waveform being correlated against a known sync waveform by summing the product of the known waveform and received waveform over a number of samples, the energy for the kth sub-band is calculated as the magnitude squared of that kth sub-band signal in time over the same number of samples as the correlated waveform, and then the cumulative energy is acquired by summing the energies of each kth sub-band over all the signal branches forming a multitude of sub-band sync correlation waveforms; and, then for each sub-band the cumulative energy of all received signal branches is calculated over a moving time window that is aligned with said sub-band sync correlation waveforms producing a plurality of moving-energy waveforms corresponding to the plurality of sub-bands, wherein the method further comprises:

prescribing a pre-determined set of sub-band combinations wherein for each combination the prescribed sub-bands are used to compute a plurality of combined sync correlation waveforms corresponding to the plurality of receive signal branches wherein each combined sync correlation waveform is formed by summing the prescribed sub-band sync correlation waveforms of the associated receive signal branch;

then for each combination a net sync correlation energy waveform is formed by adding the magnitude-squared of the combined sync correlation waveforms of the plurality of receive signal branches and scaling by the ratio of total number of sub-bands to the number of sub-bands used for said combination; and, then for each combination a combined cumulative moving-energy waveform is formed by adding samples of the moving-energy waveforms from the prescribed sub-bands.

2. The method of claim 1 further comprising:

for each said combination a sync hit is detected by comparing the instantaneous ratio of the net sync correlation energy to the combined cumulative moving-energy to a fixed threshold associated with the combination being evaluated where said threshold is generally less than unity; and, then for each combination, upon sync hit detection, a symbol timing estimate is formed by analyzing the content of the net sync correlation energy waveform in the vicinity of the point or points of sync hit detection.

3. The method of claim 2 further comprising:

forming a frequency offset estimate upon sync detection for a given combination by collecting the sample times for which a sync hit occurs at said sample times and where a sync hit occurs at said sample times plus a fixed sample delta offset associated with a second transmission of the sync word;

then forming a complex phasor by accumulating over all received signal branches and all of said sample times the complex product of the conjugate, combined sync correlation at said received signal branch and sample time, and the combined sync correlation at said received signal branch and sample time offset by the sample delta associated with the second sync word transmission;

then converting said accumulated phasor to its equivalent four-quadrant angle in radians; and, then scaling the resultant angle by the ratio of the sampling frequency to the product of two times pi times the sample delta offset.

4. The method of claim 1 further comprising:

determining a normalized net multipath sync energy formed by summing the net sync correlation energies over a specific set of sample instances within the search window of the two transmitted sync words where a sync hit occurs and where said sample instances are offset by integer multiples of a peak resolution, associated with the combination from the peak sample index within the search window corresponding to the peak value of the net sync correlation energy, thus forming the net multipath sync energy and inversely scaling by the combined cumulative moving-energy evaluated at the peak sample index, thus forming the normalized net multipath sync energy for a given combination; and, determining a net energy qualifier calculated as the same combined cumulative moving-energy evaluated at the peak sample index but scaled by the total number of sub-bands divided by the number of sub-bands used for the combination under evaluation;

then choosing the best combination upon which to base the synchronization estimates by initializing the best normalized net multipath sync energy and best net energy qualifier to zero;

then arranging the combinations such that the number of sub-bands does not increase with the combination index number;

then cycling once through all combination index numbers by, for each combination index number, replacing the best normalized net multipath sync energy and best net energy qualifier and best combination index number with those of the current combination index number if both sync hits are detected for the current combination and either the normalized net multipath sync energy exceeds the best normalized net multipath sync energy times a first threshold, or the normalized net multipath sync energy exceeds the best normalized net multipath sync energy times a second threshold and the best net energy qualifier exceeds a third threshold times the net energy qualifier associated with the current combination index number such that any of these qualifying conditions may be disabled or eliminated by adjusting the associated threshold.

* * * * *